(12) United States Patent
Bocking et al.

(10) Patent No.: US 8,289,158 B2
(45) Date of Patent: Oct. 16, 2012

(54) SYSTEM AND METHOD FOR CUSTOMIZING NOTIFICATIONS IN A MOBILE ELECTRONIC DEVICE

(75) Inventors: Andrew Bocking, Waterloo (CA); Tony Burns, Waterloo (CA); Scotte Zinn, Waterloo (CA); Cassidy Gentle, Kilehener (CA); Darin White, Waterloo (CA); Ian Milligan, Kilehener (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 11/401,917

(22) Filed: Apr. 12, 2006

(65) Prior Publication Data

US 2007/0021108 A1     Jan. 25, 2007

Related U.S. Application Data

(60) Provisional application No. 60/671,256, filed on Apr. 14, 2005.

(51) Int. Cl.
  *G08B 1/08* (2006.01)
(52) U.S. Cl. ........... 340/539.18; 340/384.1; 340/384.73; 340/539.1; 340/539.11; 455/567; 455/412.1; 455/461; 455/466
(58) Field of Classification Search ................. 340/7.49, 340/7.51, 7.52, 7.57, 7.62, 825.24, 825.36; 455/414.1, 461, 567, 418, 419
  See application file for complete search history.

(56) References Cited

U.S. PATENT DOCUMENTS

| | | | |
|---|---|---|---|
| 5,394,140 A | 2/1995 | Wong | |
| 6,177,905 B1 * | 1/2001 | Welch | 342/357.13 |
| 6,418,330 B1 * | 7/2002 | Lee | 455/567 |
| 6,570,983 B1 * | 5/2003 | Speeney et al. | 379/373.02 |
| 6,574,471 B1 * | 6/2003 | Rydbeck | 455/418 |
| 6,636,733 B1 * | 10/2003 | Helferich | 455/412.2 |
| 6,678,613 B2 * | 1/2004 | Andrews et al. | 701/213 |
| 6,990,333 B2 * | 1/2006 | Andrew et al. | 455/414.1 |
| 7,020,497 B2 * | 3/2006 | Deeds | 455/567 |
| 7,084,758 B1 * | 8/2006 | Cole | 340/539.11 |
| 7,221,939 B2 * | 5/2007 | Ylitalo et al. | 455/435.1 |
| 7,248,900 B2 * | 7/2007 | Deeds | 455/567 |
| 2003/0046304 A1 * | 3/2003 | Peskin et al. | 707/104.1 |
| 2003/0120500 A1 * | 6/2003 | Deeds et al. | 705/1 |
| 2004/0207522 A1 * | 10/2004 | McGee et al. | 340/539.13 |
| 2004/0266489 A1 * | 12/2004 | Chipchase et al. | 455/567 |
| 2005/0012611 A1 * | 1/2005 | Osman | 340/539.13 |

FOREIGN PATENT DOCUMENTS

EP        1 365 564 A     11/2003

OTHER PUBLICATIONS

Nokia "Nokia 9210 Communicator, Benutzerhandbuch" 2001 XP007901884—figure 21, p. 92 & p. 116.

* cited by examiner

*Primary Examiner* — Daniel Wu
*Assistant Examiner* — Son M Tang
(74) *Attorney, Agent, or Firm* — Gowling Lafleur Henderson LLP

(57) ABSTRACT

A mobile electronic device has a notification mechanism for notifying a user of device events in accordance with an active notification profile defining notification options and one or more exception notification profiles defining notification options based on specified attributes of a device event. A mechanism is provided for identifying one or more attributes in an incoming device event and for overriding the active notification profile with one of the exception notification profiles that has attributes corresponding to the identified attributes. The user is thus notified in accordance with notification options specified in the exception profile of the device.

15 Claims, 11 Drawing Sheets

SYSTEM AND METHOD FOR CUSTOMIZING NOTIFICATIONS IN A MOBILE ELECTRONIC DEVICE

CROSS REFERENCE TO RELATED APPLICATIONS

This application claims priority from U.S. provisional application Ser. No. 60/671,256 filed Apr. 14, 2005 and is incorporated herein by reference.

BACKGROUND

The present matter relates in general to mobile electronic devices and more particularly to a system and method for creating, managing and deploying notification profiles for notifying a user of the occurrence of a device event such as the receipt of voice or data communication or the occurrence of appointment and task reminders, browser content etc.

Mobile electronic devices, such as personal digital assistants (PDAs), cell phones, pagers, organizers and wireless mobile computing devices, generally provide some form of notification to the user when a device event occurs. The occurrence of a device event such as the receipt of a new voice or data communication, a calendar appointment reminder or an alarm is notified to the user in one or more sensory ways. These notifications typically take the form of an audible signal, a vibration, or a visual signal.

The notification can be intrusive in certain places, such as movie theatres and meeting rooms. In recognition of this problem, most modern devices are configured with profiles to control the behaviour of the device in different situations.

For example some cellular telephones have a group of profiles that allow the user to personalize the phones tone settings for different events and environments. The profiles generally allow the user to select one or more tone settings, for example, general (default), silent, meeting or outdoor. Depending on the environment, the user will scroll down a list of profiles and select the one they want to activate Some telephones include profiles that allow the user to customize the ring tones of certain types of incoming calls; such as calls with: caller identification (ID); no caller identification; or roaming.

As may be seen, current profile mechanisms allow a user to select unique notifications for device events generated by applications such as alarms, calendars, tasks or incoming voice or data communications etc. However device events may have different attributes or characteristics (such as the sender's identity in a received email) for which the user of the device desires a unique notification. Accordingly there is a need for a system and method for providing unique notifications based on attributes or characteristics of device events.

BRIEF DESCRIPTION OF THE DRAWINGS

Embodiments of the present matter will now be described, by way of example only, with reference to the attached figures, wherein:

FIGS. 7A-E illustrate screen displays of the user interface in accordance with another embodiment of the present matter;

DETAILED DESCRIPTION OF THE PREFERRED EMBODIMENTS

Figure 1:
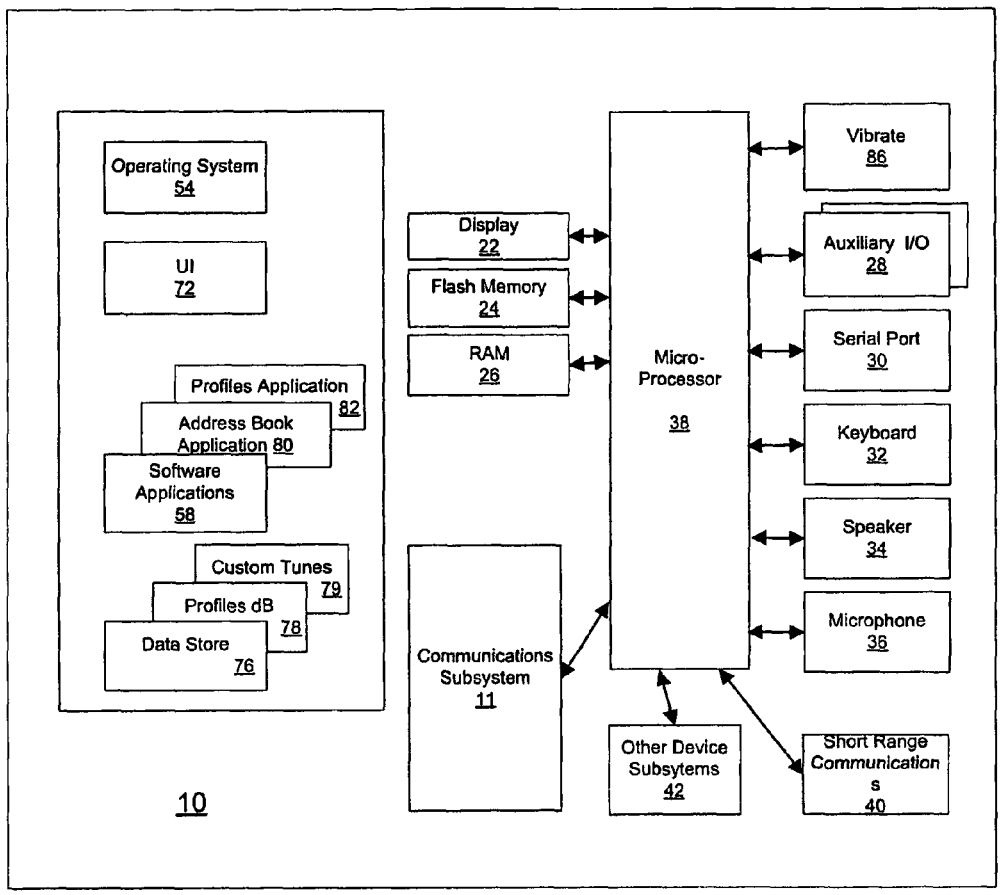
FIG. 1 is a block diagram of a mobile electronic device and a communications system to which embodiments of the present matter may be applied.
Figure 1:
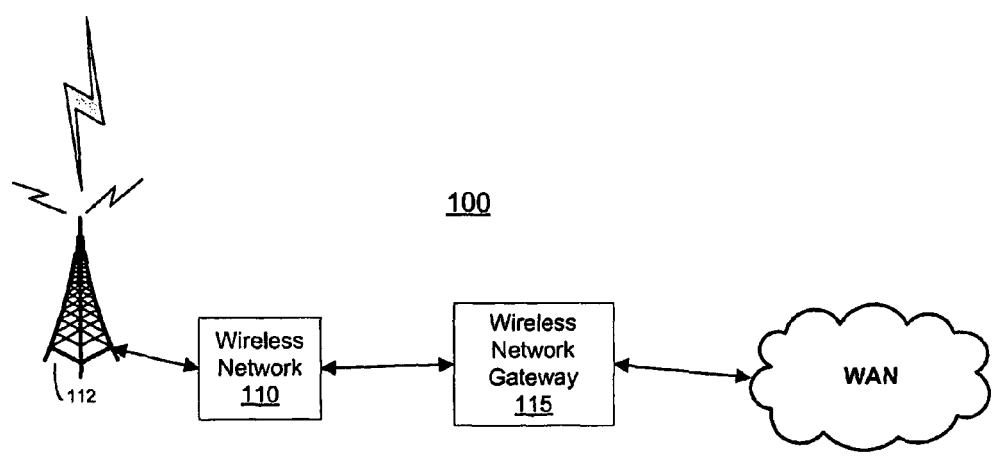

In the following description and drawings like reference numerals refer to similar elements and features.

The present matter provides a system and method in a mobile device for notifying a user of device events by responding to user identified attributes or characteristics of the received device events.

The present matter seeks to provide a user interface (UI) on a mobile device that allows users to create and manage exceptions to notification profiles and customizes device-side notification behaviour based on selected attributes or characteristics of the device events.

In a specific embodiment, the present matter allows users to create exceptions to currently active notification profiles to receive different notification for incoming messages and phone calls from specific contacts. For example the user can create a profile exception that uses a different profile when the device receives messages and phone calls from specific contacts, regardless of the active profile.

An advantage of the present matter is that it may be applied to many different device events such as incoming messages (both voice and data), including email and also does not require filter rules to be created on the mail server side. Furthermore the profile may include customized notifications which may be based on more than just 'who' is contacting the user, but also: Email characteristics (Subject, Body etc.); Time of Day, Day of Week; or a users Calendar events ("in a meeting", "busy" and such like).

Accordingly in one aspect the present matter provides a mobile electronic device comprising: a notification mechanism for notifying a user of device events in accordance with an active notification profile defining notification options; one or more exception notification profiles defining notification options based on specified attributes of a device event; a mechanism for identifying one or more attributes in an incoming device event and for overriding the active notification profile with an exception notification profile having attributes corresponding to the identified attributes, so that the user is notified in accordance with notification options specified in the exception profile.

In a further embodiment of the first aspect the matter provides a mobile electronic device, including a user interface for creating the exception profile, the exception profile comprising a data structure, including an identification field for uniquely identifying the profile, a notification field for identifying a custom notification and an attribute field for identifying an attribute on an incoming message.

In a still further embodiment of the first aspect the matter provides for a mobile electronic device including an address book application for storing contact information and wherein the exception notification profile associating an attribute of at least one contact in the address book with a custom notification.

In another aspect the present matter provides a method for notifying a user of a mobile device of a device event, the method comprising the steps of:
notifying a user of device events in accordance with an active notification profile defining notification options;
storing one or more exception notification profiles defining notification options based on specified attributes of a device event;
identifying one or more attributes in an incoming device event and overriding the active notification profile with an exception notification profile when attributes identified in the incoming device event correspond to attributes specified in the exception notification profile; and
generating a notification in accordance with the notification options specified in the exception profile.

In a still further aspect the matter provides a method for creating a profile on a mobile electronic device, the method comprising the steps of running a profile application on the device; creating a profile data structure, the data structure including an identification field for uniquely identifying the profile, a notification field for identifying a custom notification and a contact field for identifying a contact in an address book, the address book being stored on the device; and saving the created profile on the device.

In a further embodiment of the further aspect the created profile includes a field for specifying the subject about which the user wishes to be notified. In a further embodiment the present matter provides a computer-readable storage medium containing a set of instructions for instructing a processor in a mobile device, the set of instructions comprising code for: notifying a user of device events in accordance with an active notification profile defining notification options; storing one or more exception notification profiles defining notification options based on specified attributes of a device event; identifying one or more attributes in an incoming device event and overriding the active notification profile with an exception notification profile when attributes identified in the incoming device event correspond to attributes specified in the exception notification profile; and generating a notification in accordance with the notification options specified in the exception profile.

Referring now to FIG. 1, there is shown a block diagram of a communication system 100, which includes a mobile electronic device 10 to which example embodiments may be applied. In addition to the mobile electronic devices 10 (only one of which is shown in FIG. 1), the communication system 100 includes, a wireless network 110 for communicating with the mobile electronic devices 10, a wireless network gateway 115 for interfacing the wireless network 110 with a Wide Area Network (WAN) 120. The WAN 120 can in various embodiments include the Internet, a direct connection, a local area network (LAN), a wireless communication link, and any combination thereof.

The mobile electronic device 10 is a hand-held two-way mobile communication device 10 having data and voice communication capabilities, which may operate as a well-known cellular telephone. In an example embodiment, the device has the capability to communicate with other computer systems on the network 120. In various embodiments, mobile electronic devices 10 include data communication devices, multiple-mode communication devices configured for both data and voice communication, mobile telephones, mobile communication devices, PDAs enabled for wireless communications, 1-way or 2-way pagers, wireless modems operating in conjunction with computer systems, and any type of mobile wireless communication devices. In the present described embodiment, each of the mobile electronic devices 10 is configured to operate within the wireless network 110. It should be appreciated however that examples of the matter are in no way limited to these example types of devices and may be implemented in other devices with displays. Example embodiments may also be applied to devices not wirelessly enabled.

The device 10 includes a communication subsystem 11, comprising a receiver, a transmitter, and associated components such as one or more, preferably embedded or internal, antenna elements, and a processing module such as a digital signal processor (all not shown). In some embodiments, the communication subsystem includes local oscillator(s) (LO), and in some embodiments the oscillator is shared between the communication subsystem and a microprocessor 38. As will be apparent to those skilled in the field of communications, the particular design of the communication subsystem 11 will be dependent upon the communication network in which the device is intended to operate.

Signals received by the antenna through a wireless communication network 110 are input to the communication subsystem 11, which may perform such common receiver functions as signal amplification, frequency down-conversion, filtering, channel selection and the like, and in some embodiments, analog-to-digital conversion. In a similar manner, signals to be transmitted are processed by the communication subsystem 11, including modulation and encoding are input to its transmitter for digital-to-analog conversion, frequency up-conversion, filtering, amplification and transmission over the communications network 110.

The device 10 includes a microprocessor 38 that controls the overall operation of the device. The microprocessor 38 interacts with communications subsystem 11 and also interacts with further device subsystems such as a display 22, flash memory 24, random access memory (RAM) 26, auxiliary input/output (I/O) subsystems 28 (which may include a thumb-wheel, for example), serial port 30, keyboard or keypad 32, speaker 34, microphone 36, a short-range communications subsystem 40, and any other device subsystems generally designated as 42.

Some of the subsystems shown in FIG. 1 perform communication-related functions, whereas other subsystems may provide "resident" or on-device functions. Notably, some subsystems, such as keyboard 32 and display 22 for example, may be used for both communication-related functions, such as entering a text message for transmission over a communication network, and device-resident functions such as a calculator or task list.

Operating system software 54 and various software applications 58 used by the microprocessor 38 are, in one example embodiment, stored in a persistent store such as flash memory 24 or similar storage element. Those skilled in the art will appreciate that the operating system 54, specific device applications 58, or parts thereof, may be temporarily loaded into a volatile store such as RAM 26. It is contemplated that received communication signals may also be stored to RAM 26.

The microprocessor 38, in addition to its operating system functions, preferably enables execution of software applications 58 on the device. A predetermined set of software applications 58 which control basic device operations, including at least data and voice communication applications for example, will normally be installed on the device 10 during manufacture. For example, a preferred application that may be loaded onto the device may be a personal information manager (PIM) application having the ability to organize and manage data items relating to the user such as, but not limited to, instant messaging (IM), e-mail, calendar events, voice mails, appointments, and task items. Naturally, one or more memory stores are available on the device to facilitate storage of PIM data items and other information.

The PIM application preferably has the ability to send and receive data items via the wireless network. In a preferred embodiment, PIM data items are seamlessly integrated, synchronized, and updated via the wireless network, with the mobile device's user's corresponding data items stored and/or associated with a host computer system thereby creating a mirrored host computer on the device with respect to such items. This is especially advantageous where the host computer system is the mobile device user's office computer system.

Further applications may also be loaded onto the device 10 via the network 110, an auxiliary I/O subsystem 28, serial port 30, short-range communications subsystem 40 or any other suitable subsystem 42, and installed by a user in the RAM 26 or a non-volatile store for execution by the microprocessor 38. Such flexibility in application installation increases the functionality of the device and may provide enhanced on-device functions, communication-related functions, or both. For example, secure communication applications may enable electronic commerce functions and other such financial transactions to be performed using the device 10.

In a data communication mode, a received signal such as a text message or a Web page download will be processed by the communication subsystem 11 and input to the microprocessor 38, which will preferably further process the received signal for output to the display 22, or alternatively to an auxiliary I/O device 28. A user of device 10 may also compose data items such as email messages for example, using the keyboard 32 in conjunction with the display 22 and possibly an auxiliary I/O device 28. Such composed items may then be transmitted over a communication network through the communication subsystem 11.

In a voice communication mode the device 10 operates like a regular telephone and may include a caller-ID circuit (not shown) operative to extract a call identifier from an incoming call propagating on a telephone line or any other information present in the incoming call.

The serial port 30 may be used for synchronization with a user's desktop computer (not shown) and may be desirable, but is an optional device component. Such a port 30 would enable a user to set preferences through an external device or software application and would extend the capabilities of the device by providing for information or software downloads, including user interface information, to the device 10 other than through a wireless communication network. Other types of device ports (not shown) may also be used for this function.

A short-range communications subsystem 40 is a further component, which may provide for communication between the device 10 and different systems or devices, which need not necessarily be similar devices. For example, the subsystem 40 may include an infrared device and associated circuits and components or a Bluetooth™ communication module to provide for communication with similarly enabled systems and devices.

Wireless mobile network 110 is, in an example embodiment, a wireless packet data network, (e.g. Mobitex™ or DataTAC™)), which provides radio coverage to mobile electronic devices 10, although it could be any other types of wireless networks.

In accordance with an embodiment of the matter, mobile device 10 is a multi-tasking wireless communications device configured for sending and receiving data items and for making and receiving voice calls. To provide a user-friendly environment to control the operation of mobile device 10, the operating system resident on device 10 provides a graphical user interface (GUI) having a main screen and a plurality of sub-screens navigable from the main screen.

Figure 2:
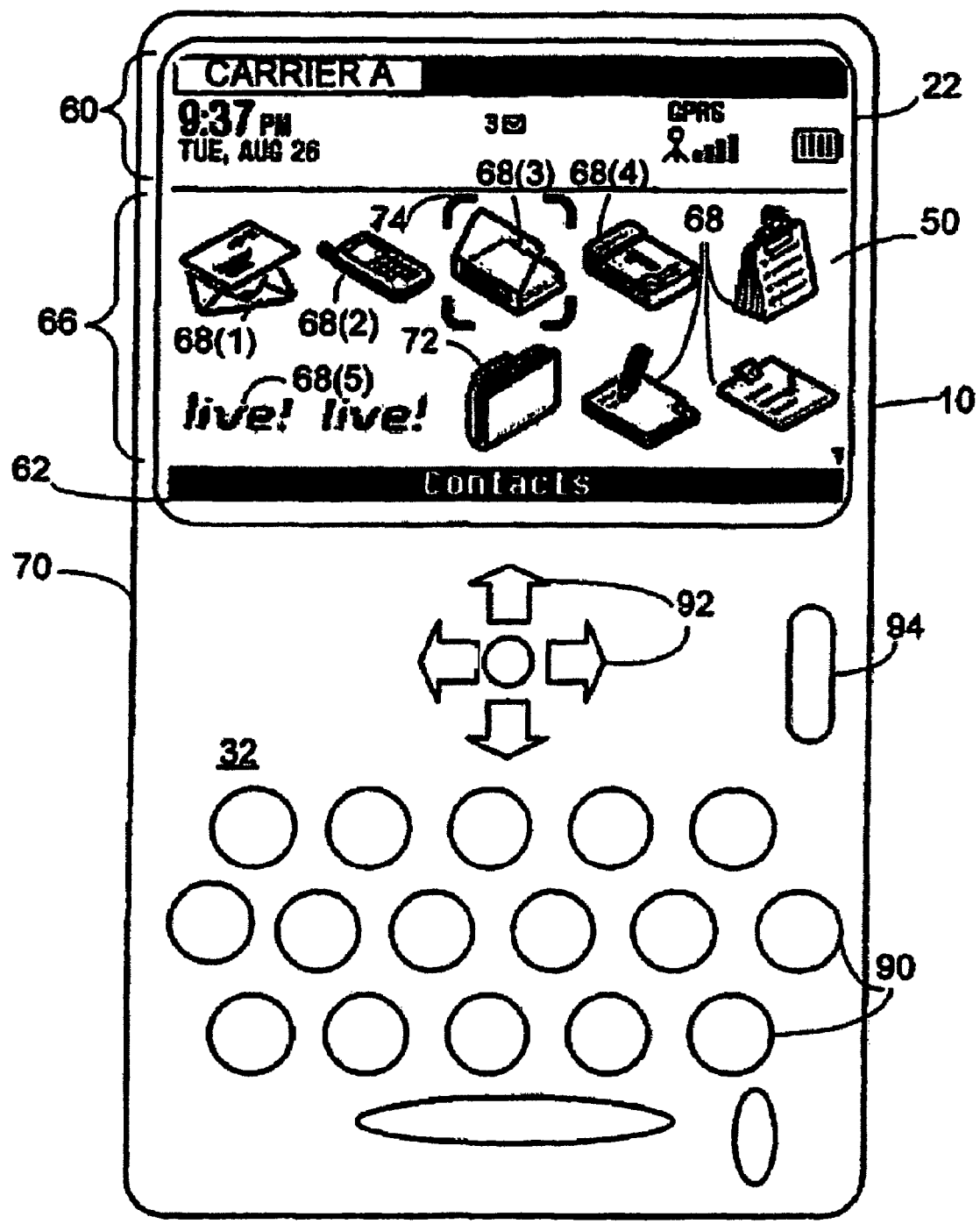
FIG. 2 is a front view of a mobile electronic device to which embodiments of the present matter may be applied.

With reference to FIG. 2, in an example embodiment, the components and subsystems of mobile electronic device 10 are housed within a hard main body case 70 that is configured to be held with one or two hands while the device 10 is in use. The mobile electronic device 10 will typically be small enough to fit inside a standard purse or suit jacket pocket. The keyboard 32 includes buttons or keys 90, 92 positioned to be actuated by the thumbs or fingers of the user. In one example embodiment, alphanumeric keys 90 are arranged in a compressed QWERTY configuration, although other keyboard configurations or user input devices could be used with device 10.

A graphical user interface 50 displayed on the display 22 of mobile electronic device 10 provides visual information to the user. A home or main screen user interface is shown from which various applications resident on the mobile electronic device 10 can be selected and launched. The main screen user interface 50 includes the following areas or sections: a title banner and status section 60, a selection banner 62 and a client section 66, each of which display one or more elements. In the illustrated embodiment, the title banner and status section 60 includes a coloured, for example red, band at the top of display 22, that includes a text element displaying the name of the carrier ("Carrier A") that operates the home wireless network 110 that the device 10 operates in. Status information including, for example, date and time, an unread incoming message count, wireless network type (GPRS), received signal strength, and battery strength is also displayed in section 60. The status elements can include alphanumeric values and/or graphic images.

The client section 66 displays elements that include a number of selectable application icons 68 and folder icons 72 that are presented on a background. The icons 68, 72 can be "focused" or selected with a caret 74 (or other type of pointer) that moves around the client section 66 in response to user manipulation of navigation keys 92 and/or scrolling of thumb scroll wheel 94, and/or other predetermined user input. The application icons 68 include, among other things, a mail messages icon 68(1), a phone application icon 68(2), an address book icon 68(3), a calendar icon 68(4), and a browser icon 68(5). Once an application icon 68 or a folder icon is focused with caret 74 it can be launched or opened by the user taking a predetermined action such as, for example, pressing a predetermined control key or pressing thumb scroll wheel 94. Such activity will typically result in a different graphic user interface being presented to the user on display 22. In the example shown in FIG. 2, the selection banner 62 displays the name ("Contacts") associated with the application or folder icon that is currently focused by caret 74.

In the present embodiment the device 10 includes as one of the selectable applications, an address book application 80 for providing a user interface and mechanism for creating and maintaining a list of contacts on the device. The device also includes storage 79 for custom tunes, which may be used in a notification profile.

In addition, the device 10 also includes a notification mechanism for alerting the user to for example, the receipt of an incoming message, such as an email or a voice message a telephone call, receipt of a text message or any other device event. The notification mechanism may use the speaker 34, display 22 or a vibrate mechanism 86 or a combination thereof. One of the features of the device is that it includes a profiles application 82, which may be used to configure the device 10 with profiles to control the behaviour of the device in different situations. In the context of the present matter a profile is data stored in a profiles database 78 of the memory 24 of the device 10. One or more profiles may be available for the device, such as LOUD, QUIET, VIBRATE and Normal (Active). An "Active" profile is the current profile selected from among the available profiles to control the device's behaviour.

Figure 3:
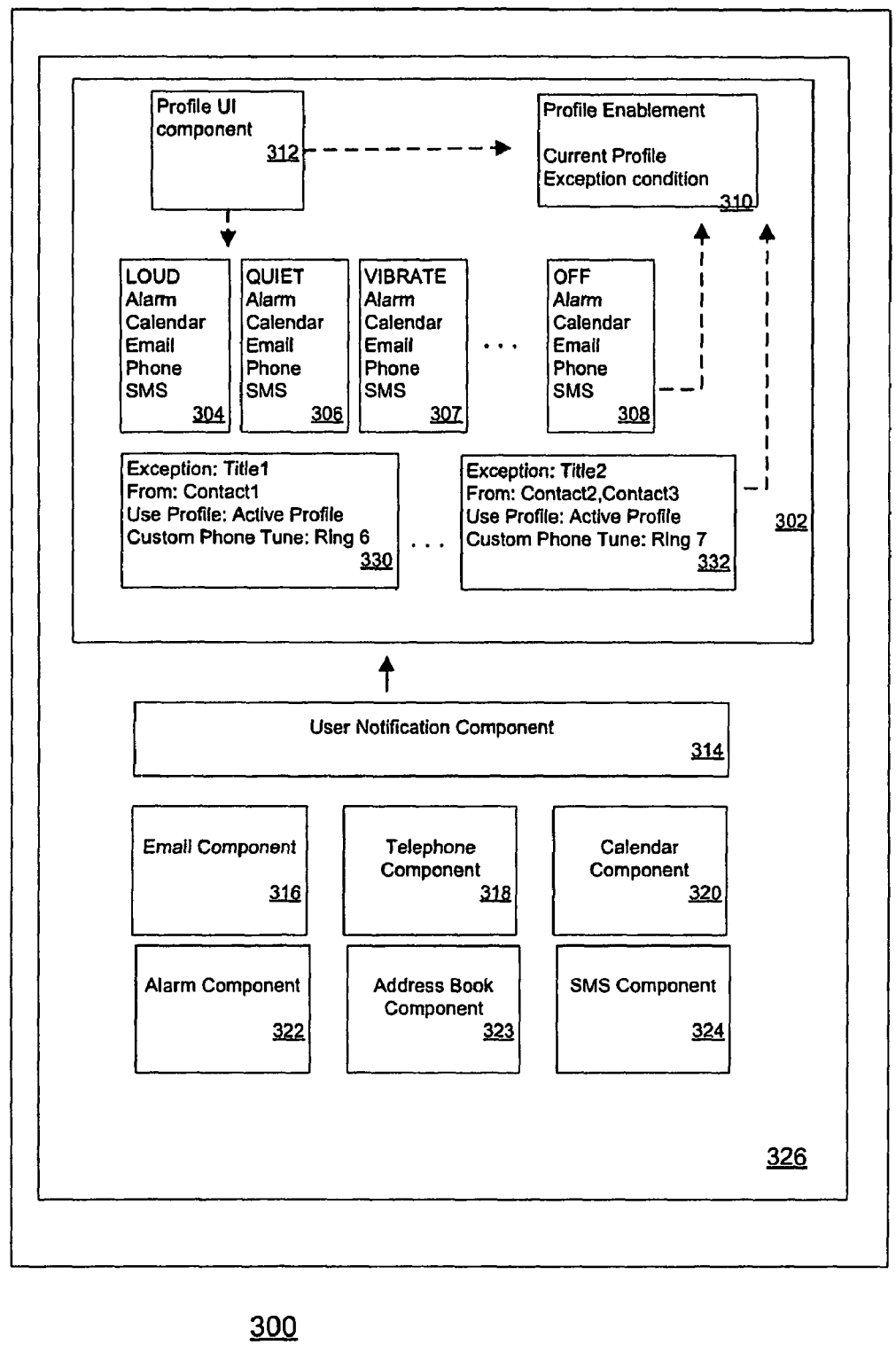
FIG. 3 is schematic diagram of a memory portion of the mobile device in accordance with an embodiment of the present matter.

Referring now to FIG. 3, there is shown various software components, which may be loaded into a memory 300 of the device 10, in accordance with an embodiment. For clarity the memory 300 is a schematic representation of a logical memory that may be implemented in one or more types of physical memory described earlier and as determined by the operating system and designer. The memory 300 comprises a PIM application component 326 described previously, which includes a plurality of event-generating, and handling components. Examples of such device event-generating and handling components include an email component 316, telephone component 318, calendar component 320, alarm component 322, an address book component 323 and SMS component 324. Persons of ordinary skill in the art will appreciate that one or more additional components may be included (not shown) such as, an IM component and a Web browser component and that not all of components 316-324 need be included.

The PIM application component 326 also provides a user notification component 314 for handling event notification for each of the components 316-324. User notification component 314 interfaces with various output or I/O devices of device 10 such as display 22 or LED (not shown), auxiliary I/O devices 28 and speaker 34.

Additionally, a user notification component 314 cooperates with profile component 302, which manages profiles such as profiles 304-308 defining user preferences for how various events are to be notified by device 10. Profile component 302 also includes a profile enablement component 310 and a user interface component 312 for configuring profiles 304-308, profile enablement options of component 310 and exception profile notification components 330-332 which specify exception options for defining how specific attributes of notification events are to be notified.

In this example embodiment, there are shown four profiles 'LOUD', 'QUIET', 'VIBRATE' and 'OFF', 304-308. Each profile includes options for defining how the user is to be notified for each of the event-generating components 316-324, namely alarm, calendar, email, phone and SMS options. Profiles are useful to define options for different user scenarios such as different ambient environments, locations or times where a user may desire particular user notification. For example, there is shown a profile 304 including a name identifier 'LOUD' indicating that the notification options of this group are selected to maximize the intrusiveness of the notification such as increasing volume for audible notifications for conditions of the event-generating components selected. Similarly there is a profile 306 having the identifier "QUIET" for defining options, which reduce intrusiveness. There is shown an 'OFF' profile 308 where the options are defined to turn off notification. Preferably, profile component 302 and user interface component 312 permit the definition of additional (i.e. new) profiles to suit user needs.

Persons of ordinary skill in the art will appreciate that a plurality of notification options may be defined for various event types such as email events. For example, the receipt of level one or important email messages may be notified differently from regular email messages events. Details of the notification types or options per se are omitted and are not important to the scope of the matter.

Further, in this example embodiment there are shown two exception notification profiles 330, 332 for defining notification options for email contacts. The exception profiles shown include an event attribute field "From:" for assigning names of one or more contacts from the address book 80. Other event attribute fields may also be included such as: Email characteristics (Subject, Body, etc.); or Time of Day, Day of Week; or a users Calendar events ("in a meeting", "busy" and such like).

The notification options of an exception profile my also be based on an exiting profiles or it may use the existing active profile with a custom notification, specified by the exception profile. For example exception profile 330 specifies the use of the "Active Profile" with a custom phone tune of Ring 6 when a device event (incoming email) is received from Conact1. Similarly exception 332 uses a custom phone tune Ring 7 when an email is received from contacts2 or contacts3.

In accordance with an embodiment of the matter, there is provided a manner of enabling and managing a notification profiles and exceptions to the profiles based on characteristics of the event generating components and automatically switching to another profile dependant on the list of specified exceptions.

Figure 4:
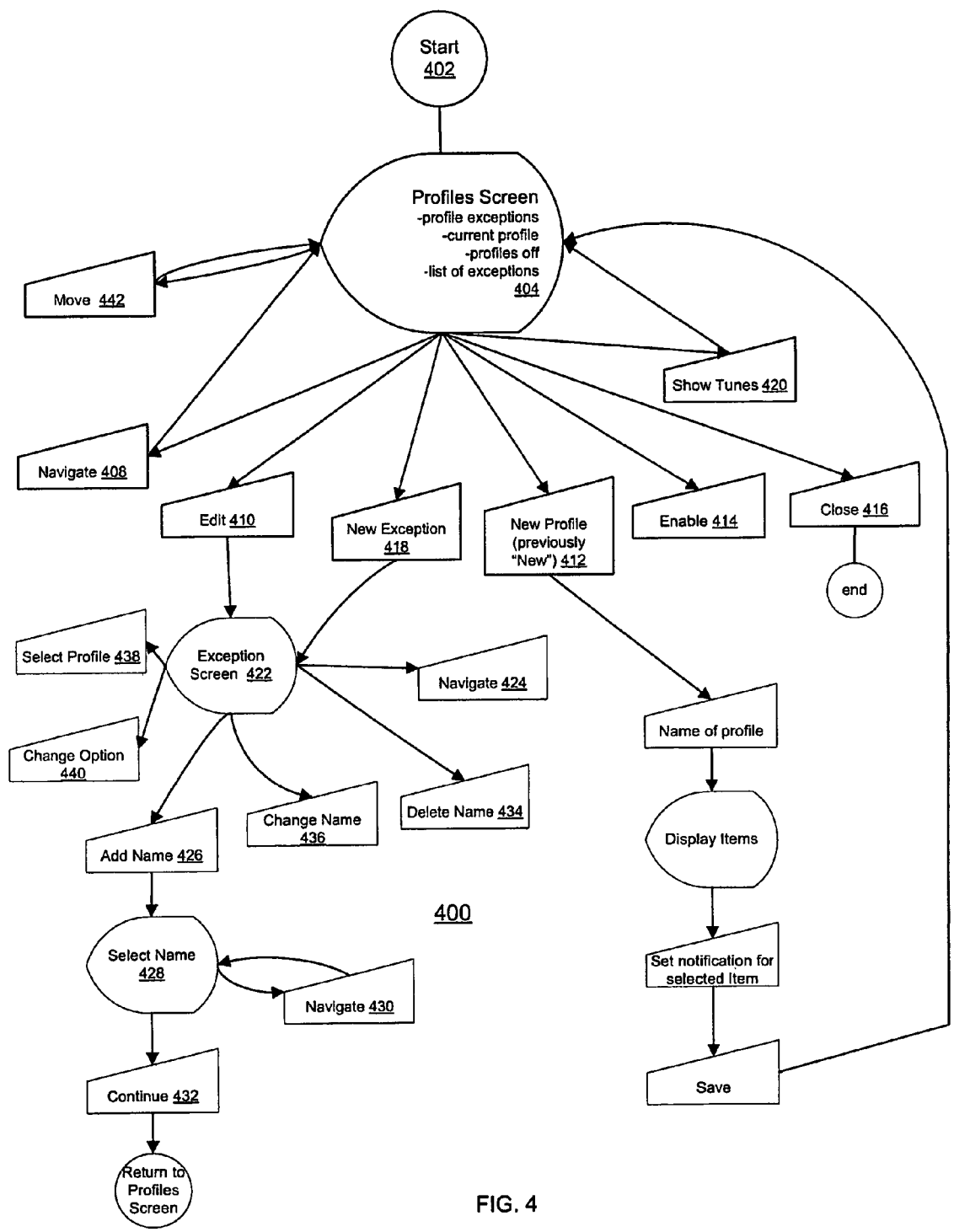
FIG. 4 is a flowchart showing a method for a user interface in accordance with an embodiment of the present matter.

Referring now to FIG. 4 there is shown a flowchart 400 for a method of using a user interface to device 10 for creating or maintaining profiles and exceptions useful for controlling the device 10. FIGS. 5A-5W show corresponding screens for the steps described in FIG. 4

Figure 5:
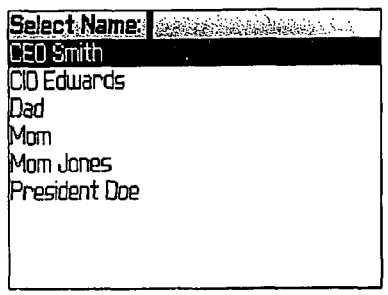
FIGS. 5A-W illustrate screen displays of the user interface in accordance with an embodiment of the present matter.
Figure 5:
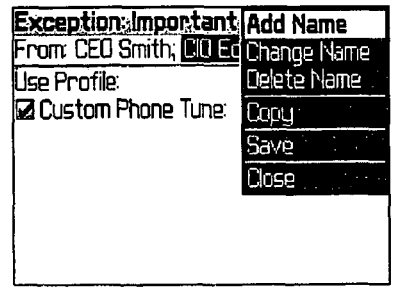
Figure 5:
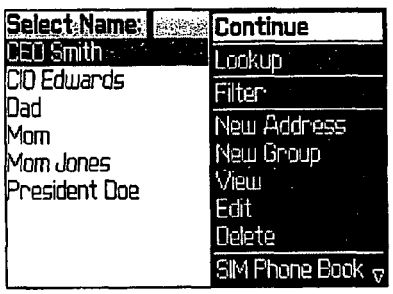
Figure 5:
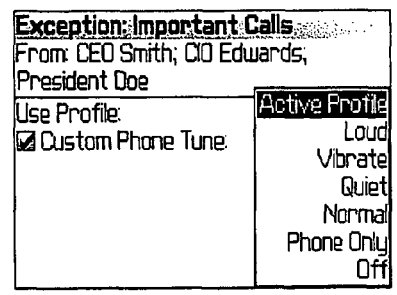
Figure 5:
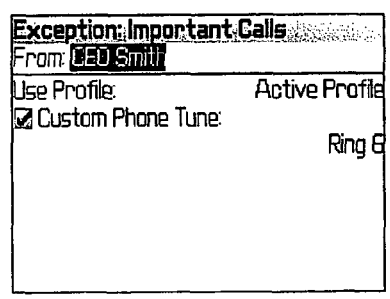
Figure 5:
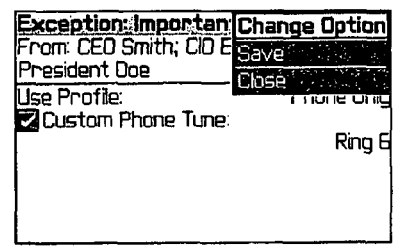
Figure 5:
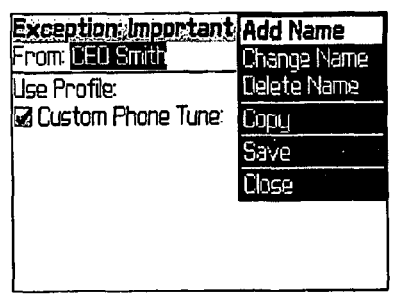
Figure 5:
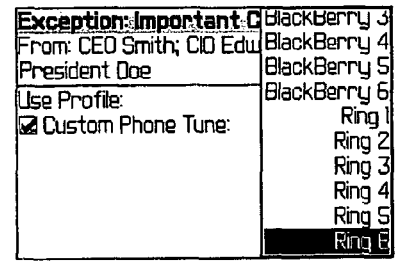
Figure 5:
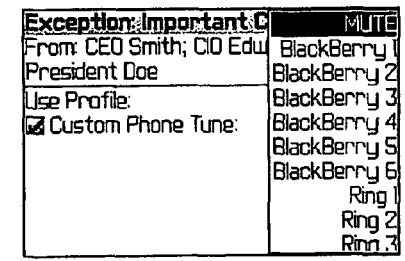
Figure 5:
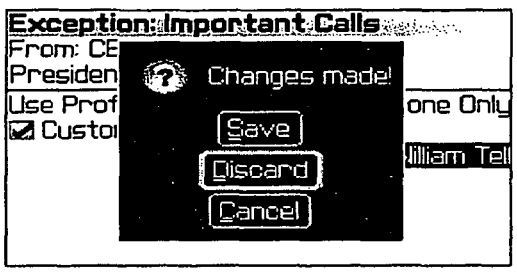
Figure 5:
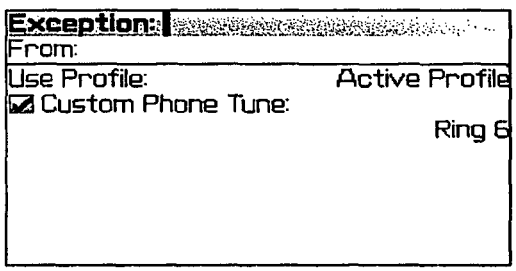
Figure 5:
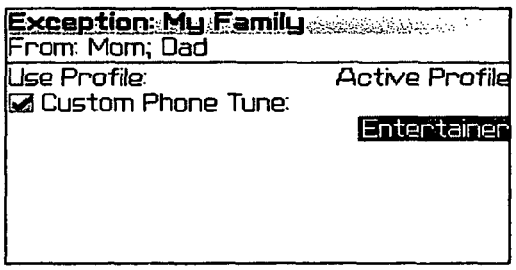
Figure 5:
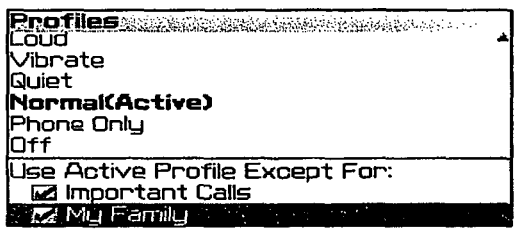
Figure 5:
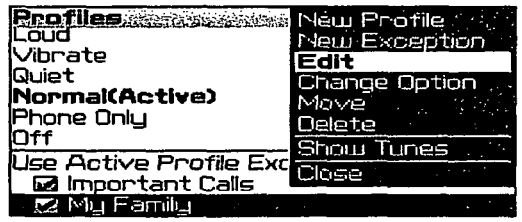
Figure 5:
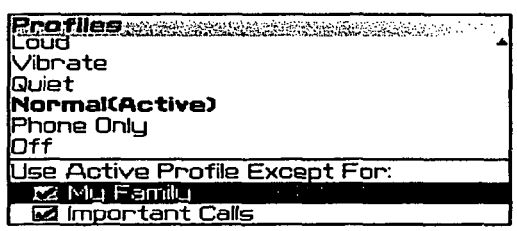

Referring now to FIG. 4 and FIG. 5, beginning at start block 402, the user invokes the profile user interface component 312 by launching the profiles application on the device, for example, by clicking on an icon in the GUI 50. At step 404 a profiles screen 500 is displayed, showing a list of menu items, as illustrated in FIG. 5A. The menu items include a list of available profiles 502, a default ("Active") profile 504 and a list of exceptions 506 each with a corresponding checkbox, which overrides the current profile when checked. In this example, the default profile is named "Normal" and an "(On)" indicator for currently enabled profile is labelled "(Active)". The device 10 may be initially supplied to the user with a sample exception such as an "Important Calls" exception (which can be deleted). For example a profile screen is illustrated in FIG. 5B in which an "Off" profile is shown which is non-editable, and which will turn off ALL notifications for the device (tune, vibrate, and LED), and NO exceptions apply in this case.

From this main screen 500, a user may navigate among the various menu items to select a particular menu item for further operation (step 404). If the user chooses to select a particular profile 502 for further operation, then, using the keyboard 32 or other auxiliary I/O devices 28 such as a thumbwheel for moving a cursor or focus about the screen. The user may choose among a plurality of options for a selected profile such as editing the selected profile (step 410), creating a new profile (step 412), enabling the selected profile (step 414), showing tunes available on the device 10 (step 420) or closing the profile user interface component 312 (step 416). When a profile exception 502 has focus, the option of creating a new exception (step 418) are presented as a new menu item (FIG. 5C) and when a profile has focus the edit menu item is hidden (FIG. 5D).

Furthermore, when an exception in the list of exceptions has focus as illustrated in FIG. 5E, the "Edit" menu item applies to that exception. In addition when an exception has focus there is a "Delete" menu item to delete that exception and a "Change Option" menu item to check/uncheck the exception checkbox. If the exception is unchecked the default focus menu item may be set to "Change Option", otherwise it is set to the "Edit" menu item.

If a user navigates to an exception in the list of exception and chooses to edit (step 410) a selected exception an exception screen is displayed (step 422). For example, as illustrated in FIG. 5F there is shown an exceptions screen which includes various fields such as a title field which is the title of the exception that will appear in the profiles screen, a "From:" field for adding a name from a list of contacts in the address book application 80, a "Use Profile" field which specifies a base profile to use to override the currently enabled/active profile and a "Custom Phone Tune:" checkbox that indicates whether to override the phone tune from the specified profile with a custom tune. In FIG. 5F, the exceptions screen title field contains the title "Important Calls" which is displayed in the list of exceptions of the profiles screen 500. As shown the "Use Profile" field is set to use the "Active Profile" and "Custom Phone" tune field is set to the default phone tune (indicated as Ring 6) for the device 10, as illustrated in FIG. 5F. In an embodiment the device 10 is delivered to the customer with the fields pre-filled as illustrated in FIG. 5F.

From this exceptions screen, a user may navigate among the various fields to select a particular field for further operation (step 424). If the user moves focus to the title field of the exception a list of standard menu items is presented, which include "Select", "Clear Field", "Save", "Show symbols" and "Close" as illustrated in FIG. 5G. If the user moves focus to the "From:" field in the exceptions screen a list of menu items including "Add Name", "Save" and "Close" is displayed, with the "Add Name" item having focus by default, as illustrated in FIG. 5H.

If the user selects the "Add Name" item (step 426) an address book screen is displayed (step 428), which displays a list of contacts from the address book application 80, as illustrated in FIG. 5I. The user may navigate (step 430) through the list of contacts, by selecting a contact a list of menu items as illustrated in FIG. 5J will be displayed, with the default menu item being "Continue". By selecting the "Continue" menu item (step 432) the selected contact name will be pasted into the "From:" field in the exception screen, as illustrated in FIG. 5K.

As illustrated in FIG. 5L when the "From:" field has focus and contains at least one name the list of menu items includes a "Delete Name" menu item to remove the selected name from the field. When deleting a name (step 434) there is no prompt, since it's easy enough to add back in with "Add Name". The menu items also include a "Change Name" menu item between "Add Name" and "Delete Name" to change a specific contact to another.

A list of contacts may be included in the "From:" field by using a semi-colon to separate the names of contacts in the list, as illustrated in FIG. 5M. This list is not free-form editable. Rather, scrolling through the field selects one name at a time, which can then be deleted if necessary. Adding names to the field is done through the "Add Name" menu item. There is also a "Change Name" menu item to change a specific contact to another. The user may change a name by selecting the "Change Name" menu item (Step 436), which then displays the select name screen (Step 428). Once done the user may select the "Continue" menu item (Step 432), which then displays the exception screen (Step 422), with the appropriately populated fields.

In the exception screen, when the user navigates (Step 424) to the "Use Profile" field, a list of menu items, listing available profiles is displayed which include "Active Profile", "Loud", "Vibrate", "Quiet", "Normal", "Phone Only" and "Off" as illustrated in FIG. 5N. As mentioned previously, the "Use Profile" field specifies a base profile to use to override the currently enabled/active profile. A value of "Active Profile" (the default) is used to specify that the exception should use the actively enabled profile. Note in this case, if there is not a specified "Custom Phone Tune:" (or if the specified tune is the same as the phone tune in the Active profile) then this exception will have no effect. The user can select one of the specified profiles by focussing on the corresponding menu item (Step 438).

From the exception screen the user can navigate (Step 424) to the "Custom Phone Tune:" checkbox field that indicates whether to override the phone tune from the specified profile with a custom tune. By selecting the "Change option" menu item (Step 440 and illustrated in FIG. 5O), the user is presented with a screen list of available tunes, as illustrated in FIG. 5P, which amongst others includes a "MUTE" entry as illustrated in FIG. 5Q, which will force the phone ringer to be quiet for this exception regardless of the Active Profile.

Finally, once the user attempts to navigate away from the exceptions screen a standard "Save|Discard|Cancel" dialog screen is displayed, as illustrated in FIG. 5R, when trying to exit this screen if changes have been made.

When in the Profiles screens the user may choose to create a new exception by selecting the "New Exception" menu item (Step 412). A blank exceptions screen is displayed (Step 422). As illustrated in FIG. 5S, when choosing "New Exception" from Profiles screen, a blank exception is created with blank title and "From" fields, and set to use "Active Profile" with "Custom Phone Tune" set to the default phone tune for the device. The user may then choose to fill in the values in each of the fields in a manner as described earlier. FIG. 5T illustrates an exception screen with values filled in. As shown the exception is entitled "My Family" and uses the current profile for all notifications, except any phone calls from the specified contacts ("Mom and Dad") that will use the specified tune ("Entertainer") at the volume set by the current profile.

When there is more than one exception in the list of exceptions displayed on the profiles screen 500. The user may navigate (step 408) to an exception. When the exception has focus, a "Move" menu item is displayed. The user can select the move menu item (Step 442), which allows the exception to be moved up and down the list by scrolling (using the track-wheel) until a track-wheel click, which places the exception in its resting spot, as illustrated in FIGS. 5U-5W.

Figure 6:
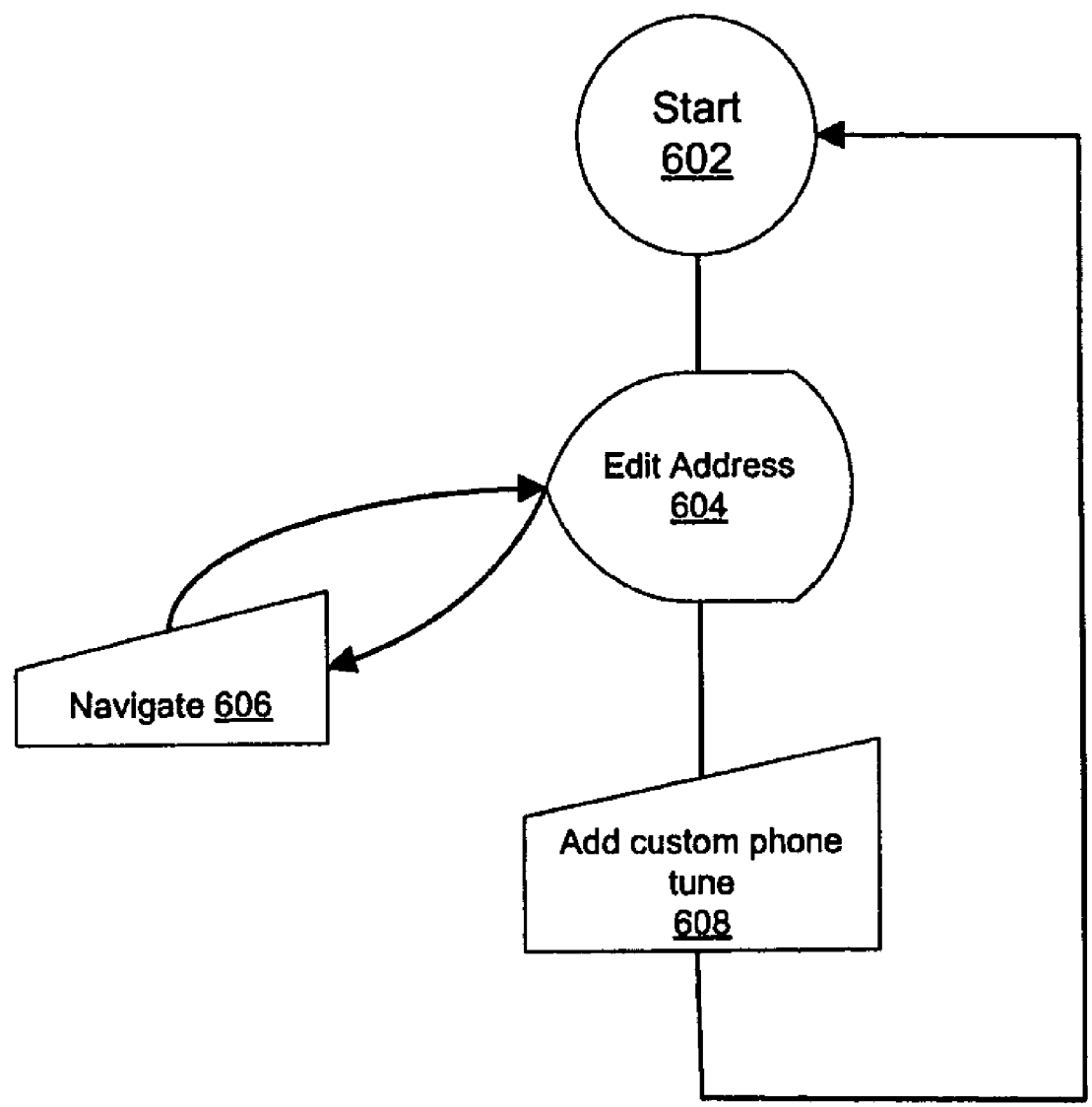
FIG. 6 is a flowchart showing a method for a user interface in accordance with another embodiment of the present matter.
Figure 7:
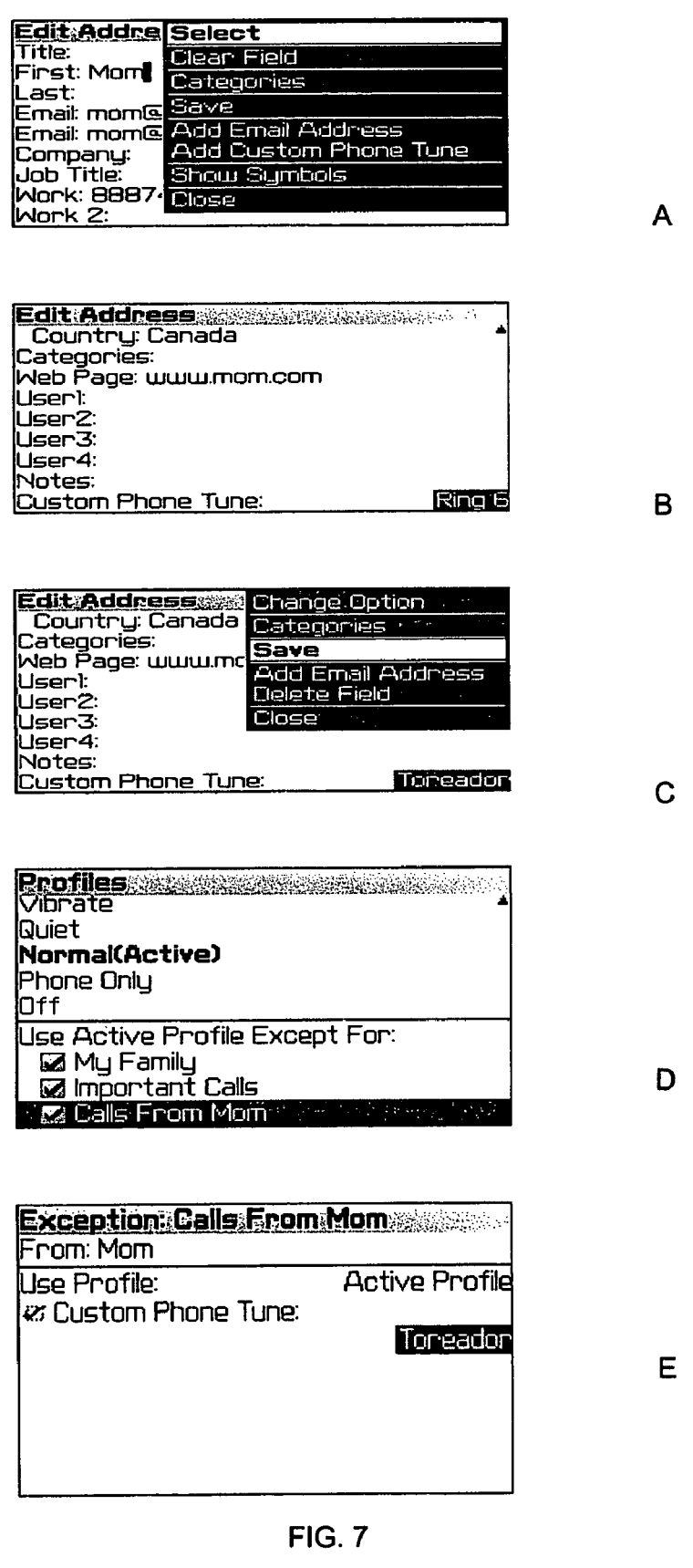

An embodiment provides for the user to associate a custom tune with a contact in the address book of the device 10. Accordingly, referring to FIG. 6, beginning at start block 602, the user invokes the address book application 80, on the device and the user may navigate to the edit address screen (step 604). As illustrated in FIG. 7A-7C the user navigates (step 606) from the "Edit Address" screen in the address book, where there is a menu item to "Add Custom Phone Tune" (provided the contact doesn't already have one) (Step 608). This adds a field to the edit address screen allowing the user to select a tune from the list of available tunes (and MUTE). When an address entry contains a custom phone tune and it has focus on the edit screen, there is a "Delete Field" menu item, which will delete the custom phone tune.

When a "Custom Phone Tune" is added to an address book entry, an exception is created with the name from the address book, for example the title of the exception may read "Calls From X" where X is the name of the contact, Use Profile is "Active Profile", and Custom Phone Tune is what the user selected, as illustrated in FIG. 7D. Note that nothing is actually stored in the address book entry for the contact.

The user may also edit the exception "Calls From X" in the profiles screen. As described previously the user navigates (Step 408) to the edit option (Step 422) to edit the exception. In this case, all the fields in the exception screen are read-only and non-focusable, except for the custom tune choice field, as illustrated in FIG. 7E. This is for simplicity to synchronise the custom tunes with an address book entry.

Figure 8:
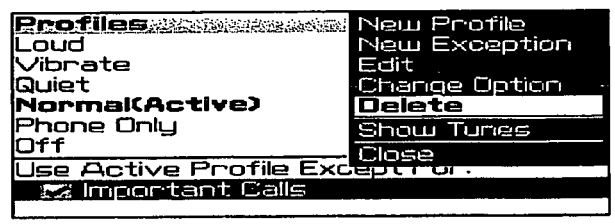
FIGS. 8A-C illustrate screen displays of the user interface in accordance with another embodiment of the present matter.
Figure 8:
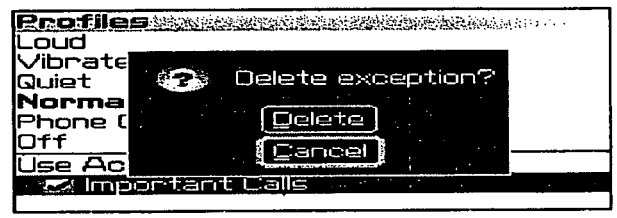
Figure 8:
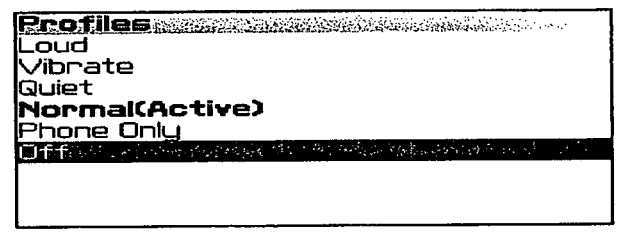

The user may also choose to delete exceptions from the profile screen. In this case the user navigates (Step 408) to the relevant exception, deletes the exception and confirms deletion of the exception, as illustrated in FIGS. 8A-8B. When all the exceptions are deleted, the Profiles screen no longer contains the "Use Active Profile Except For" list of exceptions, as illustrated in FIG. 8C.

Figure 9:
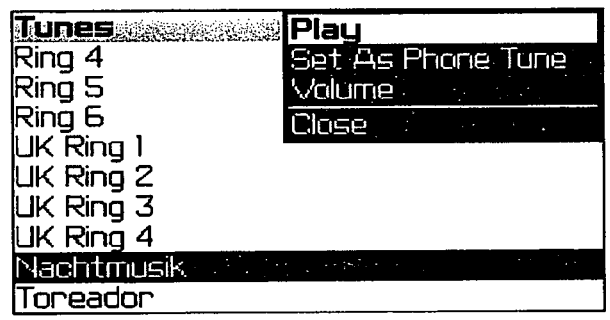
FIGS. 9A and 9B illustrate screen displays of the user interface in accordance with another embodiment of the present matter.
Figure 9:

For cases where the user just wants to set their phone ring tone to a specific tune, without having to go into each and every profile and adjust the phone tune for different (for example, if the device is in a holster), the user navigates to the "Show Tunes" listing screen (Step 420) from the profiles screen. From the "Show Tunes" listing screen, as illustrated in FIGS. 9A-9B this menu item (Set As Phone Tune) will set all the phone tunes across all the profiles. There is also a "Volume" menu item in Show Tunes that allows the Volume to be changed when listening to sample ring tunes. When viewing an address book entry that contains a custom phone tune, the tune is listed out on the display.

In summary, the following describes the various use cases when creating or modifying a profile exception:

Creating a Profile Exception
(a) The user starts the Profiles Application
(b) The user selects the "New Exception"
(c) The user enters the title of the exception, the contacts that the exception applies to, the profile to use for the exception, as well as the custom phone tune for the exception if appropriate.

Deleting a Profile Exception
(a) the user starts the Profiles application
(b) The user highlights the exception they wish to delete
(c) The user selects "Delete" from the menu (or presses the "DEL" key)
(d) The user is prompted to "Delete/Cancel"
(e) The user selects "Delete" and the exception is deleted Adding a Custom Phone Tune from Address Book
(a) The user starts the Address Book application
(b) The user selects "Add Custom Phone Tune"
(c) The user selects the desired custom tune from a list of tunes (pulled from the Profiles application).

Setting a Tune as the Phone Tune for all Profiles (without having to do so one by one)
(a) The user starts the Profiles application
(b) The user selects "Show Tunes"
(c) The user scrolls to the desired ring tune
(d) The user selects "Set as Phone Tune"
(e) This then sets the Phone Tune for all Profiles to this tune As can be appreciated the mechanism of the present matter can be extended to allow customized notifications based on more than just 'who' is contacting the user, but also: Email characteristics (certain Subject, Body, etc. . . . ), Time of Day, Day of Week, and even leveraging the users Calendar (i.e. if 'in a meeting').

In accordance with an embodiment, when a contact is added by the user of the device 10 using the "Add Name" menu item (Step 426), the following information is stored with the profile exception 330: address card unique identification (UID), the name, a string containing contact information, either a PIN, email address, or phone number, a byte indicating the type of contact information (preference is given to PIN, then email address, then phone number since a pin will more likely uniquely identify a contact).

Figure 10:
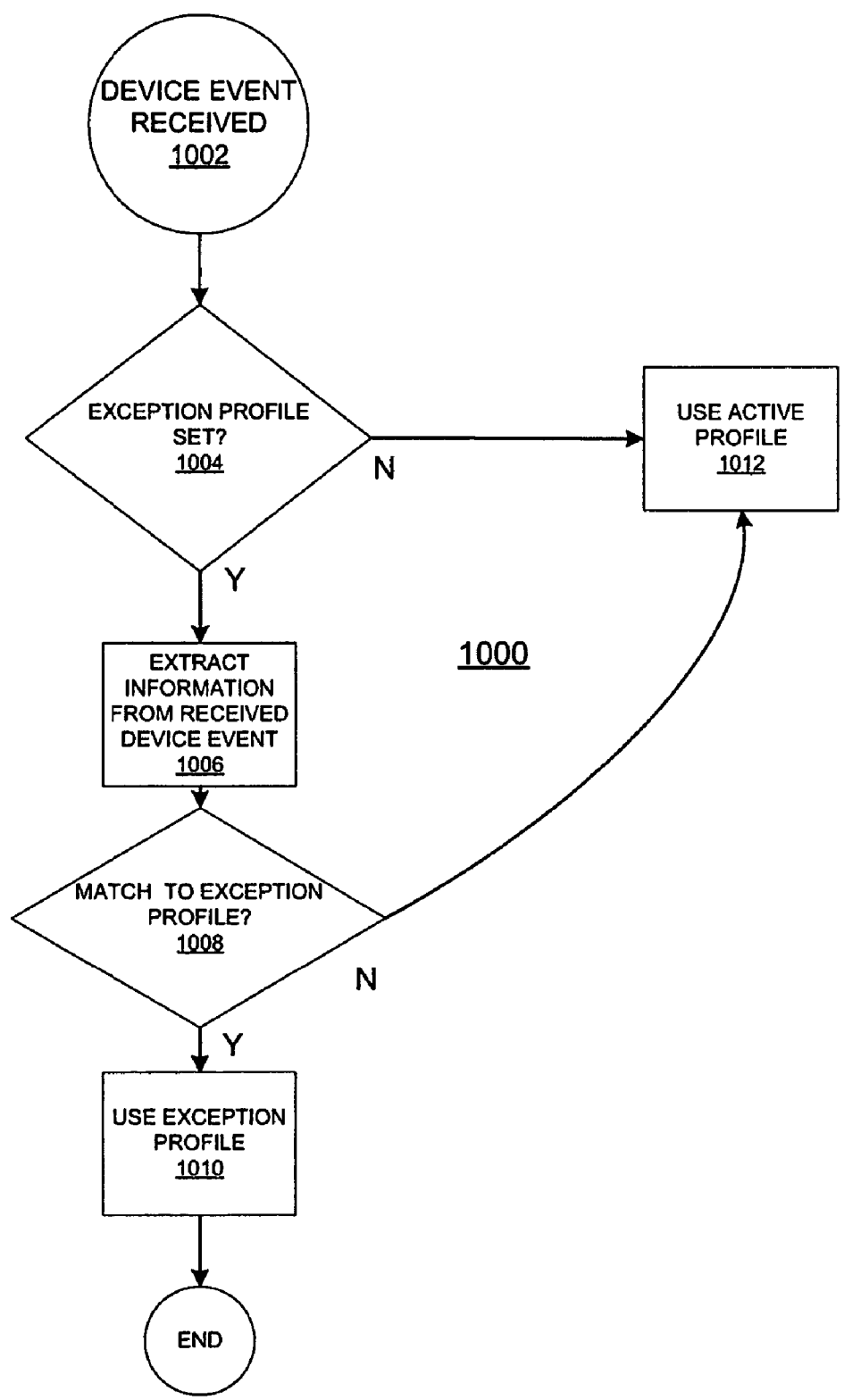
FIG. 10 is a flowchart showing a method for controlling the device in accordance with an embodiment of the present matter.

FIG. 10 illustrates a flowchart showing a method in accordance with an embodiment of this matter to control the operation of the device 10. At step 1002 a device-identified notification event is received. In the present example it is assumed that the device event is the receipt of an email message by the device, though the device event could be any of the events such as described earlier. If a profile exception has been enabled, the device 10 will extract the relevant information from the received device event (such as the sender information in an email), a lookup or comparison is made with the address card information stored with the profile exceptions. If one of the profile exceptions matches, then that profile exception is used to generate the device notification; otherwise the device simply uses the notification set in the active profile.

While certain features of the matter have been illustrated as described herein, many modifications, substitutions, changes and equivalents will now occur to those skilled in the art. It is, therefore, to be understood that the appended claims are intended to cover all such embodiments and changes as fall within the true spirit of the matter.

What is claimed is:

1. A mobile electronic device comprising:
a notification mechanism for notifying a user of device events in accordance with an active notification profile selected from a plurality of notification profiles and one or more exception notification profiles stored on the mobile electronic device;
said active notification profile selectable by a user of the mobile electronic device, each of said plurality of notifications profiles comprising first notification options associated with one or more device event types and defining a respective notification for the one or more device event types; and
said one or more exception notification profiles defining second notification options, different from the first notification options, a second notification options to be used as a notification of a device event associated with a contact stored in an address book and specified attributes of the associated device event, at least one specified attribute associated with a calendar event attribute; and
a profile component for:
identifying the contact associated with an incoming device event and one more attributes of the device event;
selecting second notification options instead of first notification options of said active notification profile for the associated device event type, when one of said one or more exception notification profiles has specified attributes corresponding to the contact and said one or more identified attributes and a calendar event in a calendar application; and
selecting first notification options of said active profile when none of said one or more exception notification profiles have specified attributes corresponding to the incoming device event.

2. A mobile electronic device as defined in claim 1, said attribute of the one or more attributes being an identity of a sender in a received message.

3. A mobile electronic device as defined in claim 1, said one or more exception notification profiles including an identification field for uniquely identifying the profile and a notification field for identifying a custom notification to be used by the notification mechanism and at least one attribute field.

4. A mobile electronic device as defined in claim 3, said custom notification being a ring tune.

5. A mobile electronic device as defined in claim 3, said attribute field identifying a contact in the address book.

6. A mobile electronic device as defined in claim 3, said attribute field identifying a plurality of contacts in the address book.

7. A mobile electronic device as defined in claim 3, said attribute field for identifying a subject in an email subject.

8. A mobile electronic device as defined in claim 3, said attribute field identifying a specified text in an email body.

9. A mobile electronic device as defined in claim 3, said attribute field identifying a time of day.

10. A mobile electronic device as defined in claim 3, said attribute field identifying a day of week.

11. A mobile electronic device as defined in claim 1, including a user interface for creating said one or more exception notification profiles, each of the one or more exception notification profiles comprising a data structure, including an identification field for uniquely identifying the profile, a notification field for identifying a custom notification, and an attribute field for identifying an attribute on an incoming message.

12. A mobile electronic device as defined in claim 11, including a memory for storing said one or more exception notification profile data structures.

13. A method for notifying a user of a mobile device of a device event, said method comprising:

notifying a user of device events in accordance with an active notification profile selected from a plurality of notification profiles and one or more exception notification profiles stored on the mobile device;

said active notification profile selectable by a user of the mobile electronic device, each of said plurality of notification profiles comprising first notification options associated with one or more device event types and defining one or more notifications for the one or more device event types; and said one or more exception notification profiles defining second notification options different from the first notification options, said second notification options to be used as a notification of a device event associated with a contact in an address book and specified attributes of the device event, at least one specified attribute associated with a calendar event attribute; and said notifying comprising:

identifying the contact associated with an incoming device event and one or more attributes of the device event;

selecting second notification options instead of said first notification options of said active notification profile for the associated device event type, when one of said one or more exception notification profiles defines attributes corresponding to the contact and said one or more identified attributes and a calendar event in a calendar application;

selecting first notification options of said active profile when none of said one or more exception notification profiles have specified attributes corresponding to the incoming device event; and generating the notification to the user of the incoming device event in accordance with said selected notification.

14. A method as defined in claim 13, said one or more exception notification profiles including an identification field for uniquely identifying the profile and a notification field for identifying a custom notification to be used by the notification mechanism and at least one attribute field.

15. A method as defined in claim 13, further comprising enabling or disabling said one or more of exception notification profiles.

* * * * *